United States Patent Office 3,410,790
Patented Nov. 12, 1968

3,410,790
REFORMING PROCESS WITH MONOFLUORIDE TREATED NOBLE METAL CATALYST
Richard E. Rausch, Mundelein, Ill., assignor to Universal Oil Products Company, Des Plaines, Ill., a corporation of Delaware
No Drawing. Filed Dec. 19, 1966, Ser. No. 602,516
9 Claims. (Cl. 208—139)

ABSTRACT OF THE DISCLOSURE

Naphtha reforming by contacting a naphtha feed at reforming conditions with a catalyst comprising a refractory inorganic oxide containing a Group VIII metal, which has been chemically combined with a subfluoride vapor such as aluminum monofluoride.

---

This invention relates to a reforming process for the conversion of a petroleum feed into more useful compounds. More specifically, this invention is concerned with a reforming process for the conversion of a petroleum feed utilizing a novel catalyst comprising a refractory inorganic oxide containing at least one metal from Group VIII of the Periodic Table chemically combined with a metal subfluoride vapor.

It is a specific object of this invention to provide a reforming process for the conversion of a petroleum feed utilizing a novel reforming catalyst so as to maximize the yield of $C_5$ plus hydrocarbons.

Another specific object of this invention is to provide a novel process and a novel catalyst for the conversion of a petroleum feed so as to maximize the yield of $C_3$ and $C_4$ hydrocarbons while minimizing the yield of $C_1$, $C_2$ and $C_5$ plus hydrocarbons.

One embodiment of the invention relates to a reforming process for the conversion of a petroleum feed which comprises contacting said feed at reforming conditions with a catalyst comprising a refractory inorganic oxide containing at least one metal from Group VIII of the Periodic Table chemically combined with a metal subfluoride vapor.

Other objects and embodiments will be found in the following further detailed description of the invention.

The process of my invention is especially applicable to the reforming of a petroleum feed in the presence of a particular catalyst and under selected conditions of operation, herein called reforming conditions. The petroleum feed to be reformed in accordance with my invention comprises a saturated gasoline fraction which may include straight-run gasoline, natural gasoline, etc. The gasoline fraction may be a full boiling range gasoline having an initial boiling point of at least about 50° F. and an end boiling point of about 425° F. or lower, or it may be a selected fraction thereof which is commonly referred to as naphtha and generally has an initial boiling point of from about 150 to about 250° F. and an end boiling point within the range of from about 350° F. to about 425° F.

As hereinbefore set forth, the invention is concerned with a reforming process for the conversion of a petroleum feed, said process being effected in the presence of a catalyst which possesses a high degree of hydrocarbon conversion activity and is particularly effective as a reforming catalyst. The catalyst comprises a refractory inorganic oxide containing at least one metal from Group VIII of the Periodic Table chemically combined with a metal subfluoride vapor. Satisfactory refractory oxides for the preparation of catalysts for use in the process of this invention include high surface area crystalline alumina modification such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides, containing at least one metal from Group VIII of the Periodic Table, such as silica, zirconia, magnesia, thoria, etc., and combinations of refractory oxides containing at least one metal from Group VIII of the Periodic Table such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide containing at least one metal from Group VIII of the Periodic Table that is combined with a metal subfluoride vapor to effect chemical combination of the refractory inorganic oxide with said metal subfluoride vapor.

Typical metals from Group VIII of the Periodic Table for use in the present invention include platinum, palladium, ruthenium, rhodium, osmium and iridium and mixtures thereof. Platinum and palladium are particularly preferred. The Group VIII component of my novel catalyst for use in the present invention will normally be utilized in an amount of from about 0.01 percent to about 2 percent by weight.

Particularly preferred metal subfluorides include the aluminum sulfluoride including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide containing at least one metal from Group VIII of the Periodic Table with the metal subfluoride vapor is accomplished as hereinafter described.

The catalyst of the present invention comprises a metal subfluoride vapor chemically combined with the refractory inorganic oxide containing at least one metal from Group VIII of the Periodic Table so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide containing at least one metal from Group VIII of the Periodic Table at temperatures in the range of 650° C. to about 1200° C. and at a pressure of from about subatmospheric to about 7 atmospheres. The formation of the metal subfluoride vapor, and especially the formation of anhydrous aluminum monofluoride is accomplished by sweeping with a gas such as helium, argon or hydrogen and preferably helium, a stoichiometric mixture of aluminum metal (melting point about 660° C.) and aluminum trifluoride (melting point greater than 1000° C.) which is heated to about 750 to 800° C. The refractory inorganic oxide containing at least one metal from Group VIII of the Periodic Table which is then chemically combined with the anhydrous aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide containing at least one metal from Group VIII of the Periodic Table catalyst support and then heating in vacuum in a furnace tube at elevated temperatures.

The process of this invention utilizing the catalyst hereinbefore set forth may be effected in any suitable manner and may comprise either a batch or continuous type operation. The preferred method by which the process of this invention may be effected is a continuous type operation. One particular method is the fixed bed operation in which the petroleum feed is continuously charged to a reaction zone containing a fixed bed of the desired catalyst, said zone being maintained at the proper operating conditions of temperature and pressure, that is, a temperature in the range of from about 800° F. to about 1100° F. or more, and preferably from about 850° F. to about 1050° F. and a pressure including a pressure of from about 50 p.s.i.g. to about 1000 p.s.i.g. or more, and preferably from about 100 p.s.i.g. to about 1000 p.s.i.g. The catalyst is suitable for either gas phase or liquid phase reactions so that the liquid hourly space velocity (the volume of charge per volume of catalyst per hour) may be maintained in the reaction zone in the range of from about 0.1 to about 20.0 or more, preferably in the range of from about 1.0 to about 15.0 or at a gaseous hourly space velocity in the range of from about 100 to about 3000 or more. The reaction zone may comprise an unpacked vessel or coil or may be lined with an adsorbent packing material. The charge passes through the catalyst bed in either an upward or downward flow and the reformed product is continuously withdrawn, separated from the reactor effluent, and recovered, while any unreacted starting materials may be recycled to form a portion of the feed stock. It is also contemplated within the scope of this invention that reaction gases such as helium, hydrogen, nitrogen, argon, etc., in a reaction gas:hydrocarbon mol ratio of from about 1:1 to about 20:1 may also be charged to the reaction zone is desired. Another continuous type operation comprises the moving bed type in which the petroleum feed and the catalyst bed move either concurrently or countercurrently to each other while passing through said reaction zone.

Still another type of operation which may be used is the batch type operation in which a quantity of the petroleum feed and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

Example I

A quartz vessel with provisions for connection to a vacuum system was filled with a mixture of about 50 grams of 1/16 inch alumina spheres containing 0.75 percent (by weight) platinum and about 10 grams of 1/8 inch pellets comprising about 20% aluminum metal and about 80% aluminum monofluoride by weight. The contents of the vessel are outgassed at a pressure of less than 10⁻⁴ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.1 weight percent was achieved. This catalyst was designated as catalyst A.

Example II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Anhydrous aluminum monofluoride was then produced. A catalyst base in the form of 1/16 inch alumina spheres containing 0.375 percent (by weight) platinum was then placed in the downstream helium flow and the aluminum monofluoride was chemically combined with the alumina base at a temperature in excess of 650° C.

The catalyst produced by this vapor deposition and chemical combination of the aluminum monofluoride with the alumina had a fluoride level of about 3.2 percent by weight of fluoride chemical combined therewith. This catalyst was designated as catalyst B.

Example III

The catalyst designated as catalyst A prepared according to Example I is utilized in a reforming reaction, a portion of the finished catalyst being placed in an appropriate continuous reforming apparatus. In the experiment, a desulfurized light Kuwait naphtha having a 181° F. initial boiling point, a 295° F. endpoint, a 64.6° API specific gravity, a paraffin content of 75% by volume, a naphthene content of 18% by volume, an aromatic content of 7% by volume and an F–1 clear octane number of about 40.0 was charged to the reforming zone at reforming conditions selected to maximize the yield of the $C_3$ and $C_4$ hydrocarbons while minimizing the yield of $C_1$, $C_2$ and $C_5$ hydrocarbons. The selected reforming conditions include a temperature of about 965° F., a pressure of about 600 p.s.i.g., a hydrogen to hydrocarbon mol ratio of about 6:1 and a liquid hourly space velocity of about 3.0. It is observed that the yield of $C_3$ and $C_4$ hydrocarbons are maximized while the yield of $C_1$, $C_2$ and $C_5$ hydrocarbons are minimized.

Subsequent experiments show that the $C_3$ and $C_4$ hydrocarbons may be maximized without the addition of any outside make-up hydrogen.

Example IV

A portion of the catalyst designated as catalyst B prepared according to Example II is utilized in the reforming apparatus. The Kuwait naphtha described in Example III is again utilized. Reforming conditions including a temperature of about 960° F., a pressure of about 100 p.s.i.g., a hydrogen to hydrocarbon mol ratio of about 10:1 and a liquid hourly space velocity of 3.0 are selected to maximize the yield of $C_5$ plus hydrocarbons. It is observed that the yield of $C_3$ and $C_4$ hydrocarbons are minimized while the $C_5$ plus yield is maximized at the desired target octane number.

Example V

A second portion of the catalyst designated as catalyst A prepared according to Example I is utilized in the reforming apparatus to maximize the yield of $C_5$ plus hydrocarbons while utilizing a desulfurized Mid-Continent naphtha having a 200° F. initial boiling point, a 400° F. endpoint, a 55.5° API specific gravity, a paraffin content of 46% by volume, a naphthene content of 48% by volume, an aromatic content of 6% by volume, and an F–1 clear octane number of 44.9. Reforming conditions selected to maximize the $C_5$ plus hydrocarbon yield included a pressure of about 100 p.s.i.g., a temperature of about 920° F., a hydrogen to hydrocarbon mol ratio of about 10:1 and a liquid hourly space velocity of 3.0. It is again observed that the $C_5$ plus hydrocarbon yield is maximized at the desired target octane number.

I claim as my invention:

1. A reforming process for the conversion of a naphtha feed which comprises contacting said feed at reforming conditions with a catalyst comprising a Group VIII noble metal, a refractory inorganic oxide, and from about 0.01 percent to about 5 percent by weight of combined fluoride, said catalyst having been prepared by compositing said noble metal with said refractory oxide and then contacting the resulting composite with vapors of an aluminum subfluoride or a silicon subfluoride, said reforming conditions including a temperature of from about 800° F. to about 1100° F., a pressure in the range of from about 50 p.s.i.g., to about 1000 p.s.i.g., a liquid hourly space velocity of from about 0.1 to about 10.0, and a hydrogen to hydrocarbon mol ratio of from about 1:1 to about 20:1, and recovering a gasoline of higher octane rating and an enhanced yield of $C_3$–$C_4$ hydrocarbons.

2. The process of claim 1, further characterized in that said subfluoride is aluminum monofluoride.

3. The process of claim 2, further characterized in that said refractory inorganic oxide comprises alumina.

4. The process of claim 2, further characterized in that said refractory inorganic oxide comprises silica-alumina.

5. The process of claim 2, further characterized in that said Group VIII noble metal is platinum.

6. The process of claim 5, further characterized in that the naphtha feed comprises a gasoline fraction having an initial boiling point of at least about 50° F. and an end boiling point of about 425° F. or lower.

7. The process of claim 6, further characterized in that the reforming conditions are selected to maximize the yield of $C_5$ plus hydrocarbons.

8. The process of claim 6, further characterized in that the reforming conditions are selected to maximize the yield of the $C_3$ and $C_4$ hydrocarbons while minimizing the yield of the $C_1$, $C_2$ and $C_5$ plus hydrocarbons.

9. The process of claim 8, further characterized in that the reforming conditions are selected so as to maximize the yield of the $C_3$ and $C_4$ hydrocarbons while minimizing the yield of the $C_1$, $C_2$ and $C_5$ plus hydrocarbons without the addition of any outside make-up hydrogen.

References Cited

UNITED STATES PATENTS

| | | | |
|---|---|---|---|
| 2,479,109 | 8/1949 | Haensel | 208—139 |
| 3,041,272 | 6/1962 | Burk et al. | 208—139 |
| 3,113,931 | 12/1963 | Voltz | 208—139 |
| 3,198,728 | 8/1965 | Evans | 208—65 |

DELBERT E. GANTZ, *Primary Examiner.*

H. LEVINE, *Assistant Examiner.*